US00RE50752E

(19) United States
(12) Reissued Patent
Peters et al.

(10) Patent Number: US RE50,752 E
(45) Date of Reissued Patent: Jan. 20, 2026

(54) DUAL WIRE WELDING SYSTEM AND METHOD

(71) Applicant: Lincoln Global, Inc., Santa Fe Springs, CA (US)

(72) Inventors: Steven Peters, Huntsburg, OH (US); Dennis Hartman, Wellington, OH (US)

(73) Assignee: LINCOLN GLOBAL, INC., Sant Fe Springs, CA (US)

(21) Appl. No.: 16/707,701

(22) Filed: Dec. 9, 2019

Related U.S. Patent Documents

Reissue of:
(64) Patent No.: 9,839,970
Issued: Dec. 12, 2017
Appl. No.: 12/975,234
Filed: Dec. 21, 2010

(51) Int. Cl.
*B23K 9/173* (2006.01)
*B23K 9/12* (2006.01)

(52) U.S. Cl.
CPC ..... *B23K 9/1735* (2013.01); *B23K 9/121* (2013.01); *B23K 9/123* (2013.01)

(58) Field of Classification Search
USPC .... 219/137.2, 137.31, 137.44, 137.51, 137.7
See application file for complete search history.

(56) References Cited

U.S. PATENT DOCUMENTS 1,368,287 A * 2/1921 Pennington et al. ..... 428/387
1,605,860 A * 11/1926 Snelling ..... 219/162
1,873,847 A * 8/1932 Miller ..... B23K 35/0277 219/145.23
2,583,507 A 1/1952 Carpenter et al.
2,594,333 A * 4/1952 Medicus ..... 219/75
2,756,311 A * 7/1956 Persson et al. ..... 219/74
2,845,524 A * 7/1958 Morley, Jr. ..... B23K 9/007 219/127
2,849,593 A * 8/1958 Volff et al. ..... 219/145.32
2,866,079 A 12/1958 Morley et al.
2,911,517 A * 11/1959 Armstrong ..... 219/137.7
2,957,101 A * 10/1960 Barkley ..... 314/129
3,131,325 A * 4/1964 Briggs ..... 314/74
3,274,371 A * 9/1966 Saenger, Jr. et al. ..... 219/137 R
3,328,556 A * 6/1967 Nelson et al. ..... 219/137 R
3,384,778 A * 5/1968 Jeannette ..... 314/68
(Continued)

FOREIGN PATENT DOCUMENTS

CN 2683302 Y 3/2005
CN 101745726 A 6/2010
(Continued)

OTHER PUBLICATIONS

D/F Machine Specialties; "D/F Automatic & Robotic MIG Tandem Torch"; https://www.dfmachinespecialties.com/index.php?option=com_content&view=article&id=35; Accessed on Oct. 15, 2018; pp. 1-4.

(Continued)

*Primary Examiner* — William E Dondero
(74) *Attorney, Agent, or Firm* — Calfee, Halter & Griswold, LLP

(57) ABSTRACT

A system and method of welding is provided where at least two welding electrodes are provided to and passed through a single orifice on a single contact tip and a welding waveform is provided to the electrodes through the contact tip to weld simultaneously with both electrodes.

16 Claims, 6 Drawing Sheets

(56) References Cited

U.S. PATENT DOCUMENTS 3,624,345 A 11/1971 Armstrong
3,693,858 A * 9/1972 Araya et al. ..... 226/108
3,694,620 A * 9/1972 Gleason ..... B23K 9/1336 219/137.7
3,746,833 A * 7/1973 Ujiie ..... 219/137 R
3,933,533 A * 1/1976 Uchida et al. ..... 219/69.1
4,012,621 A * 3/1977 Uchida et al. ..... 219/145.22
4,088,866 A 5/1978 Lund et al.
4,182,947 A * 1/1980 Brower ..... 219/70
4,295,746 A * 10/1981 Hartmann ..... 347/159
4,336,441 A * 6/1982 Godai et al. ..... 219/137 WM
4,437,906 A 3/1984 Tateishi et al.
4,475,996 A * 10/1984 Inoue ..... 206/670
4,541,616 A * 9/1985 Dean ..... 266/48
4,697,791 A * 10/1987 Henderson et al. ..... 266/48
4,743,731 A * 5/1988 Seuring et al. ..... 219/69.1
4,902,873 A * 2/1990 Ivannikov ..... B23K 35/0283 219/137 R
4,968,867 A * 11/1990 Banzai et al. ..... 219/69.12
5,148,001 A 9/1992 Stava
5,324,552 A 6/1994 Opower et al.
5,440,100 A 8/1995 Stuart et al.
5,491,321 A * 2/1996 Stuart et al. ..... 219/137.61
5,635,091 A * 6/1997 Hori et al. ..... 219/137.61
5,714,735 A * 2/1998 Offer ..... 219/136
5,773,792 A * 6/1998 Hagiwara ..... B23K 9/0672 219/130.1
5,782,987 A 7/1998 Furman
5,791,560 A 8/1998 Rogers et al.
5,816,466 A 10/1998 Seufer et al.
5,958,261 A * 9/1999 Offer et al. ..... 219/75
5,977,504 A * 11/1999 Offer et al. ..... 219/75
5,981,906 A 11/1999 Parker
6,172,333 B1 * 1/2001 Stava ..... 219/137 PS
6,225,589 B1 * 5/2001 Bartok ..... 219/69.15
6,374,655 B1 4/2002 Hresc
6,512,200 B2 1/2003 Norrish et al.
6,512,220 B1 1/2003 Park
6,627,839 B1 * 9/2003 Luckowski et al. ..... 219/76.14
6,683,271 B2 1/2004 Rogers
6,683,279 B1 * 1/2004 Moerke ..... 219/137.2
6,737,616 B1 * 5/2004 Sherrill ..... 219/536
7,112,759 B1 9/2006 Severance, Jr.
7,183,516 B2 * 2/2007 Blankenship et al. ... 219/130.31
7,271,365 B2 * 9/2007 Stava ..... B23K 9/093 219/130.33
7,429,716 B2 9/2008 Bong et al.
7,495,192 B2 2/2009 Takahashi et al.
7,525,067 B2 4/2009 Diez et al.
7,705,269 B2 4/2010 Daniel
7,761,336 B1 7/2010 Blankenship et al.
7,777,447 B2 * 8/2010 Vogel ..... 320/107
8,049,139 B2 11/2011 Houston
8,575,517 B2 * 11/2013 Ertmer ..... B23K 9/1336 219/137.31
8,723,082 B2 5/2014 Spiesberger
9,186,745 B2 11/2015 Jia et al.
9,839,970 B2 12/2017 Peters et al.
9,862,056 B2 1/2018 Berger et al.
9,895,760 B2 2/2018 Peters
9,937,577 B2 4/2018 Daniel et al.
10,052,707 B2 8/2018 Henry et al.
10,792,752 B2 10/2020 Weeks et al.
2001/0008235 A1 7/2001 Miszczak et al.
2002/0130153 A1 * 9/2002 Plow ..... B65H 51/10 226/190
2003/0209530 A1 11/2003 Stuart et al.
2004/0016735 A1 1/2004 Huismann et al.
2005/0218132 A1 10/2005 Wells
2005/0224486 A1 10/2005 Matiash
2005/0230373 A1 10/2005 Kensrue
2006/0070985 A1 4/2006 Nakabayashi et al.
2006/0081675 A1 4/2006 Enyedy
2006/0138115 A1 6/2006 Norrish et al.
2006/0175313 A1 * 8/2006 Kooken ..... B23K 9/1075 219/130.1
2006/0226137 A1 10/2006 Huismann et al.
2006/0243704 A1 11/2006 Matz et al.
2007/0007265 A1 * 1/2007 Myers ..... B23K 9/0953 219/130.51
2007/0145028 A1 * 6/2007 Artelsmair ..... 219/137.71
2007/0151964 A1 7/2007 Artelsmair et al.
2007/0158324 A1 7/2007 O'Donnell et al.
2007/0164074 A1 * 7/2007 Schorghuber et al. ..... 226/108
2007/0221643 A1 * 9/2007 Narayanan ..... B23K 9/092 219/137 R
2007/0251932 A1 * 11/2007 Vogel ..... B23K 9/0672 219/130.4
2008/0128395 A1 6/2008 Aigner et al.
2008/0169336 A1 7/2008 Spiegel et al.
2008/0190900 A1 * 8/2008 Zhang et al. ..... 219/121.45
2009/0050609 A1 2/2009 Berger et al.
2009/0188896 A1 * 7/2009 Khakhalev ..... B23K 9/1336 219/74
2009/0234483 A1 9/2009 Leko et al.
2010/0213179 A1 * 8/2010 Peters ..... 219/121.64
2010/0301030 A1 * 12/2010 Zhang et al. ..... 219/130.1
2010/0314373 A1 12/2010 Patterson
2011/0171393 A1 7/2011 Margolies et al.
2011/0309062 A1 12/2011 O'Donnell et al.
2012/0067859 A1 3/2012 Albrecht et al.
2012/0074115 A1 3/2012 Kazmaier et al.
2012/0152921 A1 6/2012 Peters et al.
2012/0285938 A1 11/2012 McFadden et al.
2013/0193115 A1 8/2013 Berg
2013/0264323 A1 10/2013 Daniel
2014/0027413 A1 1/2014 Lin et al.
2014/0166633 A1 6/2014 Albrecht
2014/0197148 A1 7/2014 Chen et al.
2015/0209889 A1 7/2015 Peters et al.
2015/0266126 A1 9/2015 Ertmer et al.
2016/0228972 A1 8/2016 Jogdand et al.
2016/0368075 A1 12/2016 Ide
2017/0080511 A1 3/2017 Jaeger et al.
2017/0165779 A1 6/2017 Barhorst et al.
2017/0189982 A1 7/2017 Hsu
2017/0368629 A1 12/2017 Grigorenko
2018/0207744 A1 7/2018 Stoecker
2018/0214966 A1 8/2018 Peters
2018/0214967 A1 8/2018 Peters
2018/0214972 A1 8/2018 Jansma et al.
2018/0214973 A1 8/2018 Jansma et al.
2018/0281097 A1 10/2018 Jansma
2018/0369947 A1 12/2018 Raudsepp et al.
2019/0047069 A1 2/2019 Weeks et al.
2019/0168334 A1 6/2019 Kooken et al.
2019/0201997 A1 7/2019 Stergios et al.

FOREIGN PATENT DOCUMENTS

CN 101870032 A 10/2010
CN 102615398 A 8/2012
CN 102430846 B 5/2013
CN 103071899 A 5/2013
CN 103170713 A 6/2013
CN 103648702 A 3/2014
CN 101712095 B 9/2014
CN 104334305 A 2/2015
CN 104439623 A 3/2015
CN 205464747 U 8/2016
CN 106270978 A 1/2017
CN 104972205 B 4/2017
CN 106670630 A 5/2017
CN 106735769 A 5/2017
CN 206241445 U 6/2017
CN 206578445 U 10/2017
CN 109382566 A 2/2019
DE 1115382 B 10/1961
DE 2108614 10/1971
DE 2108614 A1 10/1971
DE 42 04 661 C1 6/1993
DE 19611583 9/1997

(56) References Cited

FOREIGN PATENT DOCUMENTS

| | | | |
|---|---|---|---|
| DE | 19611583 | A1 | 9/1997 |
| DE | 19611597 | | 9/1997 |
| DE | 19611597 | A1 | 9/1997 |
| DE | 29819828 | U1 | 12/1999 |
| DE | 97 38 785 | C2 | 12/2001 |
| DE | 10 2008 014915 | A1 | 11/2009 |
| DE | 20 2013 102 979 | U1 | 7/2013 |
| DE | 10 2016 003468 | A1 | 9/2016 |
| DE | 10 2015 122135 | A1 | 6/2017 |
| EP | 1707296 | A1 | 10/2006 |
| EP | 1 294 522 | B1 | 9/2007 |
| EP | 3446821 | A1 | 2/2019 |
| EP | 3656497 | A2 | 5/2020 |
| EP | 3693116 | A1 | 8/2020 |
| GB | 990208 | | 4/1965 |
| GB | 990208 | A | 4/1965 |
| GB | 1502288 | | 3/1978 |
| GB | 1502288 | A | 3/1978 |
| GB | 2058637 | | 4/1981 |
| GB | 2058637 | A | 4/1981 |
| JP | H02-258168 | A | 10/1990 |
| JP | 02-280968 | A | 11/1990 |
| JP | 4053617 | B | 8/1992 |
| JP | H10-113771 | A | 5/1998 |
| JP | 2008055506 | | 3/2008 |
| JP | 2008055506 | A | 3/2008 |
| JP | 2008087045 | | 4/2008 |
| JP | 2008087045 | A | 4/2008 |
| JP | 2010069494 | | 4/2010 |
| JP | 2010069494 | A | 4/2010 |
| JP | 2010082624 | | 4/2010 |
| JP | 2010082624 | A | 4/2010 |
| JP | 5133079 | B2 | 1/2013 |
| JP | 2013-039624 | A | 2/2013 |
| JP | 5157006 | B2 | 3/2013 |
| JP | 5580869 | B2 | 8/2014 |
| JP | 6137053 | B2 | 5/2017 |
| KR | 2001-0002945 | A | 1/2001 |
| KR | 10-2010-0115997 | A | 10/2010 |
| KR | 10-1412374 | B1 | 6/2014 |
| SU | 1237347 | | 6/1986 |
| SU | 1237347 | A1 | 6/1986 |
| WO | 1997045227 | A1 | 12/1997 |
| WO | 9839138 | A1 | 9/1998 |
| WO | 2010/080411 | A1 | 7/2010 |
| WO | 2012153177 | A1 | 11/2012 |

OTHER PUBLICATIONS

Extended European Search Report from Corresponding Application No. 18187717.6; Dated Jan. 4, 2019; pp. 1-10.

Fronius; "CMT Twin"; https://www.fronius.com/en/welding-technology/products/robotic-welding/migmag-high-performance/cmt-twin/cmt-twin; Accessed on Oct. 15, 2018; pp. 1-5.

Leng, et al.; "The characteristic of twin-electrode TIG coupling arc pressure"; Journal of Physics D: Applied Physics; vol. 39(6): 1120; Dated Mar. 3, 2006.

Lincoln Electric; "Tandem MIG™ 800 Amp Welding Torch"; https://www.lincolnelectric.com/assets/US/EN/literature/E10601.pdf; Accessed on Oct. 15, 2018; pp. 1-4.

Lincoln Electric; "Wire Level Gauge"; https://www.lincolnelectric.com/assets/us/en/literature/mc0995.pdf; Accessed on Oct. 17, 2018; p. 6.

SKS Welding Systems; "Dual Wire 2.0 for double-speed welding"; https://www.sks-welding.com/en/torch-systems/dual-wire/dual-wire-20/product.html; Accessed on Oct. 15, 2018; pp. 1-2.

Ueyama, et al.; "Effects of torch configuration and welding current on weld bead formation in high speed tandem pulsed gas metal arc welding of steel sheets"; Science and Technology of Welding and Joining; vol. 10, No. 6; Dated 2005; Published Online Dec. 4, 2013; pp. 750-759.

Wolf Robotics; "Tandem Wire MIG Welding"; Dated Aug. 29, 2007; pp. 1-8.

Ye, et al.; "Research on arc interference and welding operating point change of twin wire MIG welding"; The International Journal of Advanced Manufacturing Technology; vol. 89, Issue 1-4; Dated Mar. 2017; pp. 493-502.

Extended European Search Report from Corresponding Application No. 19203369.4; Dated Jul. 31, 2020; pp. 1-8.

Extended European Search Report from Corresponding Application No. EP19203389.2; Dated Jun. 22, 2020; pp. 1-9.

Shi, et al.; "Physical Characteristics of Twin-Wire Indirect Arc Plasma;" Vacuum; vol. 107; Dated Apr. 3, 2014; pp. 41-50.

Extended European Search Report from Corresponding Application No. 19205296.7; Dated Aug. 13, 2020; pp. 1-13.

Extended European Search Report from Corresponding Application No. 19205356.9; Dated Aug. 13, 2020; pp. 1-9.

Extended European Search Report from Corresponding Application No. 21156359.8; Dated Jul. 9, 2021; pp. 1-8.

Extended European Search Report from Corresponding Application No. 21153533.1; Dated Jul. 20, 2021; pp. 1-9.

Office Action from U.S. Appl. No. 16/707,659 dated Jul. 6, 2021.

Office Action from U.S. Appl. No. 16/707,659 dated Feb. 25, 2022.

Office Action from U.S. Appl. No. 16/707,685 dated Feb. 25, 2022.

Office Action from U.S. Appl. No. 16/707,659 dated Jun. 14, 2023.

Office Action from U.S. Appl. No. 16/707,659 dated Nov. 7, 2023.

Office Action from U.S. Appl. No. 16/707,685 dated Sep. 14, 2023.

Office Action from U.S. Appl. No. 16/707,659 dated May 30, 2024.

Office Action from U.S. Appl. No. 16/707,685 dated Jun. 5, 2024.

Office Action from U.S. Appl. No. 16/707,685 dated Aug. 6, 2021.

Lincoln Electric, "Tandem MIG, Waveform Control Technology," copyright 2005, NX-3.70 10/05, 16 pages.

Office Action from U.S. Appl. No. 16/707,659 dated Jan. 10, 2025.

* cited by examiner

DUAL WIRE WELDING SYSTEM AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

Notice: More than one reissue application has been filed for the reissue of U.S. Pat. No. 9,839,970. The reissue applications are *U.S. application Ser. No. 16/707,701, filed Dec. 9, 2019* (the present application), *U.S. application Ser. No. 16/707,659, filed Dec. 9, 2019,* and *U.S. application Ser. No. 16/707,685, filed Dec. 9, 2019*, all of which are reissues of U.S. Pat. No. 9,839,970.

BACKGROUND OF THE INVENTION

Field of the Invention

Devices, systems, and methods consistent with the invention relate to welding with a dual wire configuration using a single contact tip.

Description of the Related Art

When welding, it is often desirable to increase the width of the weld bead or increase the length of the weld puddle during welding. There can be many different reasons for this desire, which are well known in the welding industry. For example, it may be desirable to elongate the weld puddle to keep the weld and filler metals molten for a longer period of time so as to reduce porosity. That is, if the weld puddle is molten for a longer period of time there is more time for harmful gases to escape the weld bead before the bead solidifies. Further, it may desirable to increase the width of a weld bead so as to cover wider weld gap or to increase a wire deposition rate. In both cases, it is common to use an increased electrode diameter. The increased diameter will result in both an elongated and widen weld puddle, even though it may be only desired to increase the width or the length of the weld puddle, but not both. However, this is not without its disadvantages. Specifically, because a larger electrode is employed more energy is needed in the welding arc to facilitate proper welding. This increase in energy causes an increase in heat input into the weld and will result in the use of more energy in the welding operation, because of the larger diameter of the electrode used.

BRIEF SUMMARY OF THE INVENTION

An exemplary embodiment of the present invention is a welding system and method for welding where a welding power supply provides a welding waveform to a contact tip having an exit orifice. A wire feeding mechanism provides at least two welding electrodes having a circular cross-section to a channel in the contact tip, where each of the electrodes passes through the channel in a longitudinal orientation and exits the contact tip through the same exit orifice. The welding waveform is provided to each of the electrodes by the contact tip for a welding operation.

BRIEF DESCRIPTION OF THE DRAWINGS

The above and/or other aspects of the invention will be more apparent by describing in detail exemplary embodiments of the invention with reference to the accompanying drawings, in which.

FIG. [5] *5A* illustrates a diagrammatical representation of an exemplary embodiment of a welding system of the present invention*;*

Figure 5A:
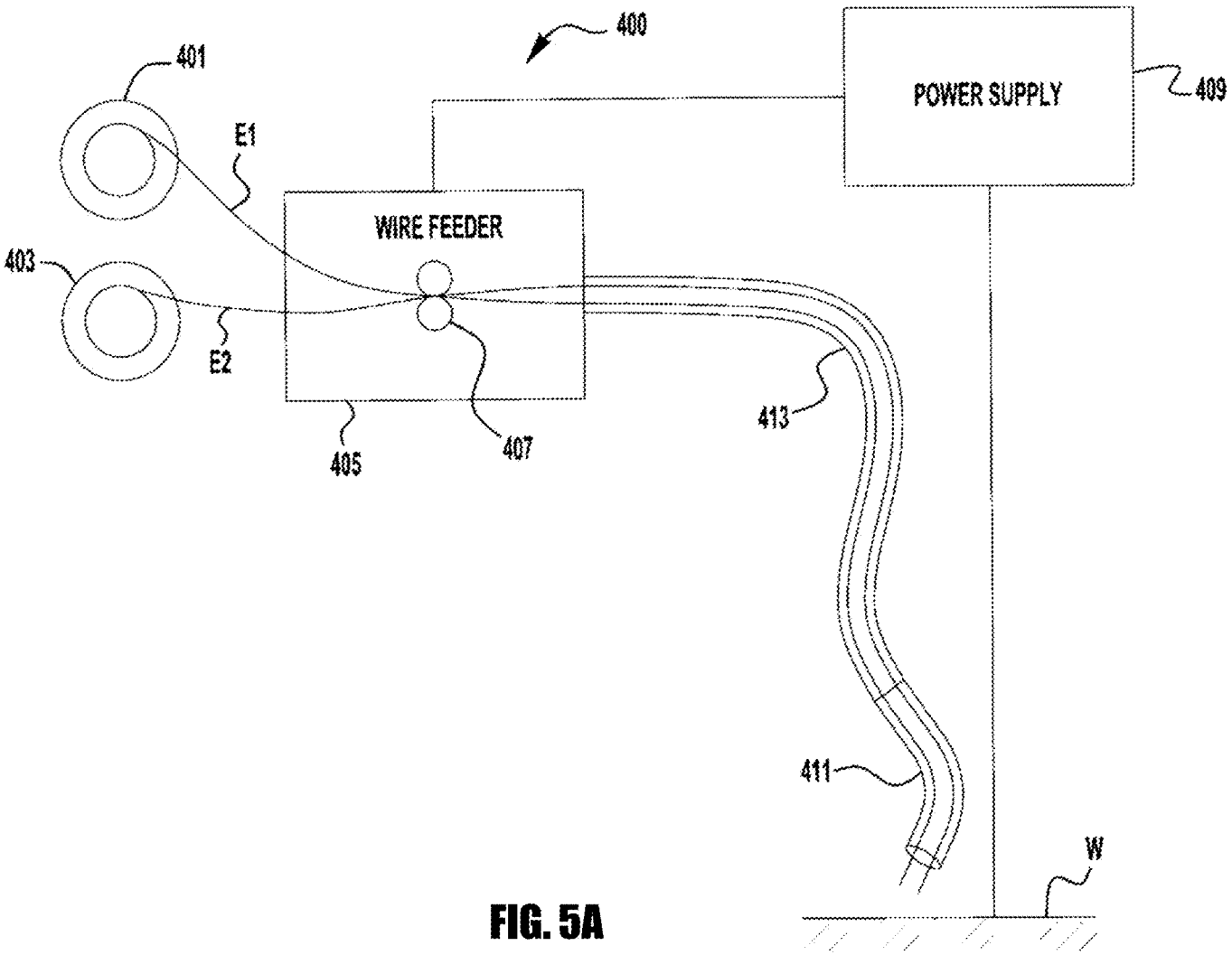
Figure 5B:
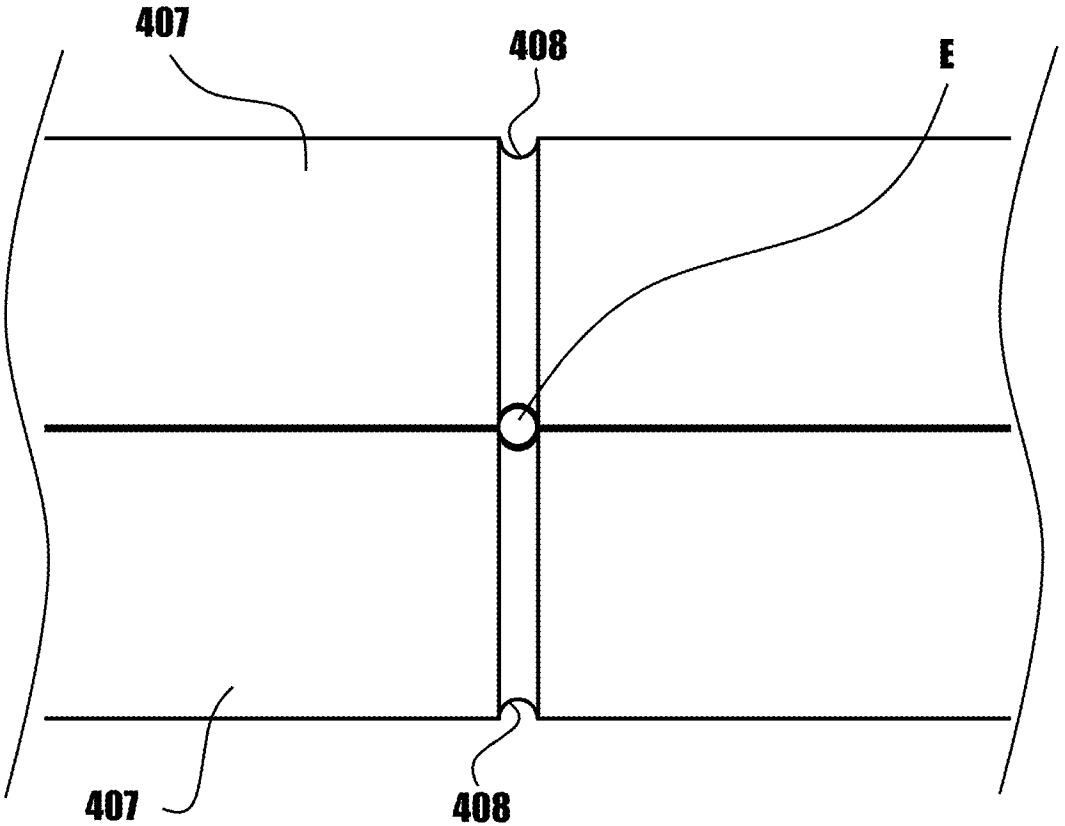
FIG. 5B PRIOR ART

*FIG. 5B illustrates a diagrammatical representation of known prior art rollers each having a single operable groove and designed for a single wire feeding operation in a single wire feeding operation; and*

Figure 5C:
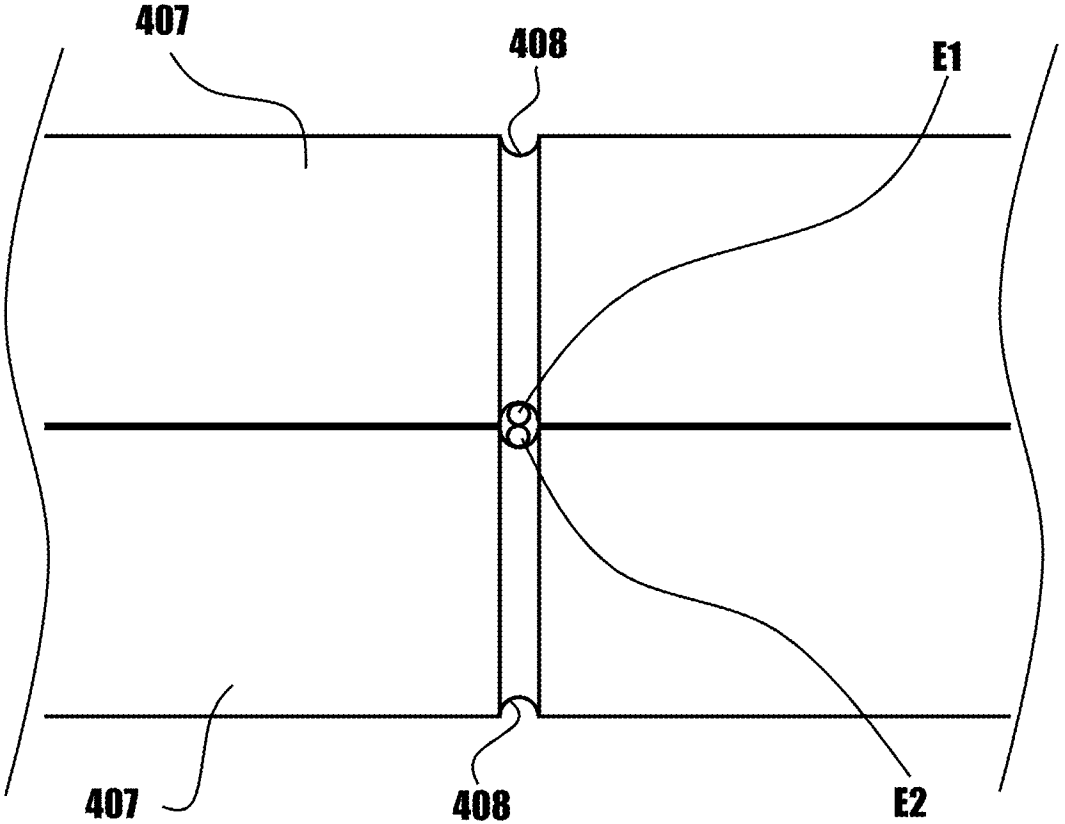

*FIG. 5C illustrates a diagrammatical representation of the rollers of FIG. 5B used in an operation for feeding two wires in a dual wire configuration.*

DETAILED DESCRIPTION OF EXEMPLARY EMBODIMENTS

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Figure 1:
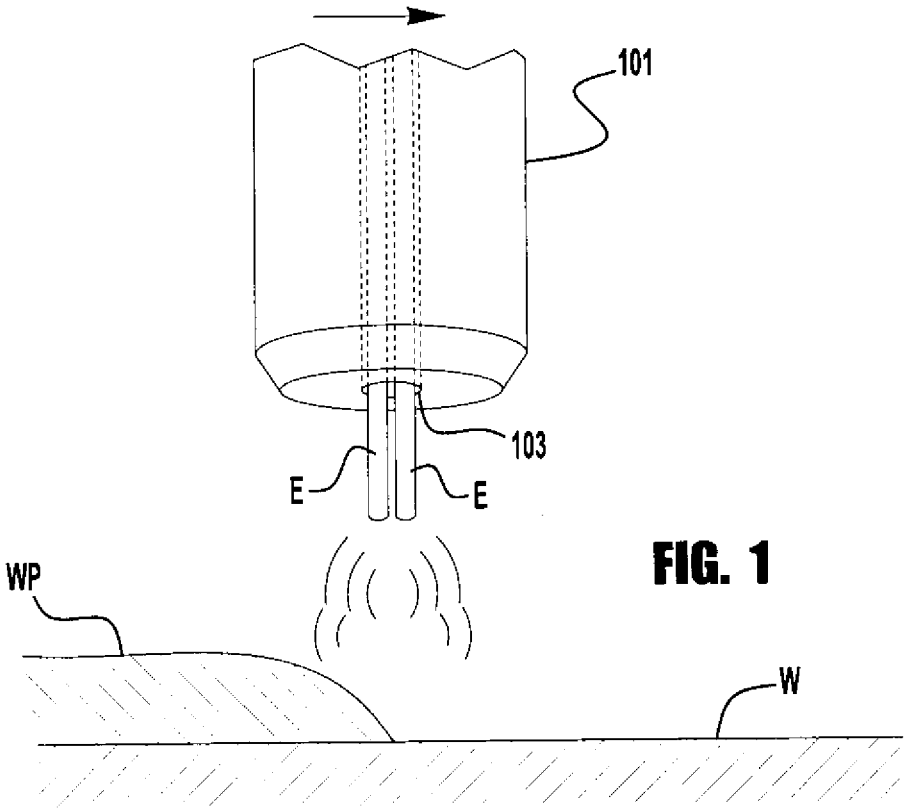
FIG. 1 illustrates a diagrammatical representation of an exemplary embodiment of the present invention.

FIG. 1 is a representative diagrammatical representation of an exemplary embodiment of the present invention. Specifically, a contact tip 101 is shown having two welding electrodes E passing through the same orifice 103 in the tip 101. Typically, in welding with a contact tip 101 a single electrode E is passed through the orifice 103. However, in the present invention at least two electrodes E are passed through the same orifice 103 in a single tip 101.

Figure 2:
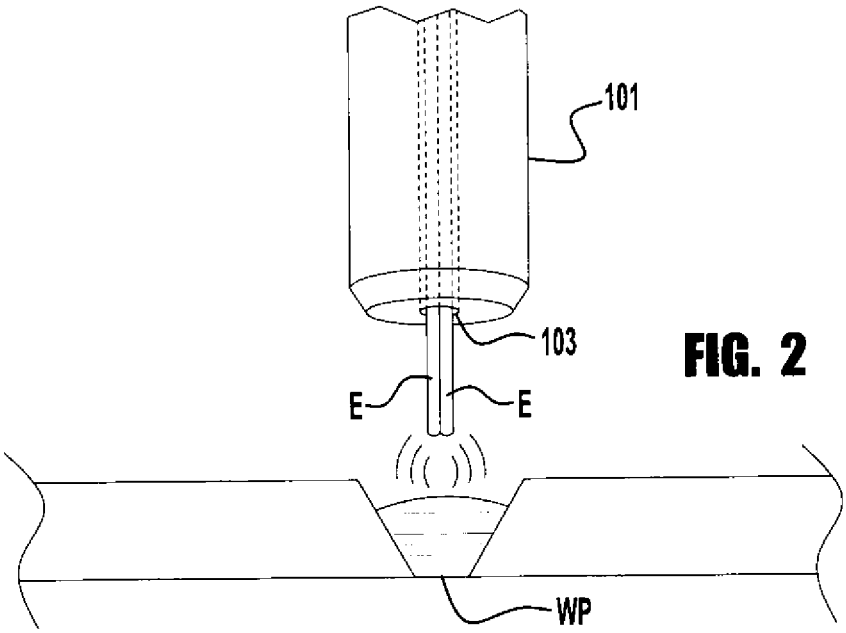
FIG. 2 illustrates a diagrammatical representation of another exemplary embodiment of the present invention.

In FIG. 1, the electrodes E are shown in a tandem configuration. That is, the electrodes E are positioned in the orifice 103 in a front-to-back configuration related to the direction of travel of the contact tip 101 during welding. This tandem electrode configuration provides an elongated weld puddle WP, but does not increase the width of the weld puddle. FIG. 2 similarly shows an exemplary embodiment of the present invention in which the electrodes E are shown in a side-by-side configuration coming out of the same orifice 103 of the same contact tip 101. In using a side-by-side configuration a wider weld puddle WP can be produced when desired.

By employing embodiments of the present invention, an [increase] *increased* weld puddle width or length is achieved without the undesired increase in heat input associated with employing a larger diameter single electrode, as is traditionally done. For example, it may *be* desirable to have a weld puddle WP width which is consistent with the use of an electrode having a width of 0.0625 inch. Traditionally, a single electrode having a 0.0625 inch diameter would be employed, requiring the energy input necessary to properly weld with an electrode of this size. However, in an exemplary embodiment of the present invention, two electrodes E having a diameter of 0.030 inch each can be employed in a side-by-side configuration to achieve the same weld puddle width. However, rather than requiring the energy input needed to weld with a 0.0625 inch diameter wire, this embodiment of the present invention will only require the energy input necessary for welding with a 0.045 inch diameter wire. This is because, although the width of the weld puddle achieved is similar to that of a 0.0625 inch diameter electrode, the overall cross-sectional area of the combined 0.030 inch diameter electrodes is similar to that of a single 0.045 inch diameter electrode. Thus, only the energy needed to weld with a 0.045 inch diameter electrode need be utilized while a width consistent with a 0.0625 inch diameter electrode is achieved. Similarly, in the example discussed above a welding waveform designed for only a 0.045 inch diameter electrode can be utilized. It is not necessary to employ a welding waveform for a 0.0625 inch diameter electrode.

Furthermore, in an exemplary embodiment of the present invention, a standard sized contact tip can be utilized. For example, in the above discussed example, a standard 0.052 inch diameter orifice contact tip 101 can be utilized. Typically, the actual orifice diameter of a standard 0.052 inch diameter orifice contact tip is about 0.060 inches. Because of this, two 0.030 inch diameter electrodes E can be passed through the single orifice 103 easily. Of course, the present invention is not limited to the example set forth above, which is merely intended to be exemplary to aid in the understanding of the present invention.

In various embodiments of the contact tip 101 the orifice 103 has a diameter sufficient to transfer the welding waveform into each of the electrodes E.

Figure 3:
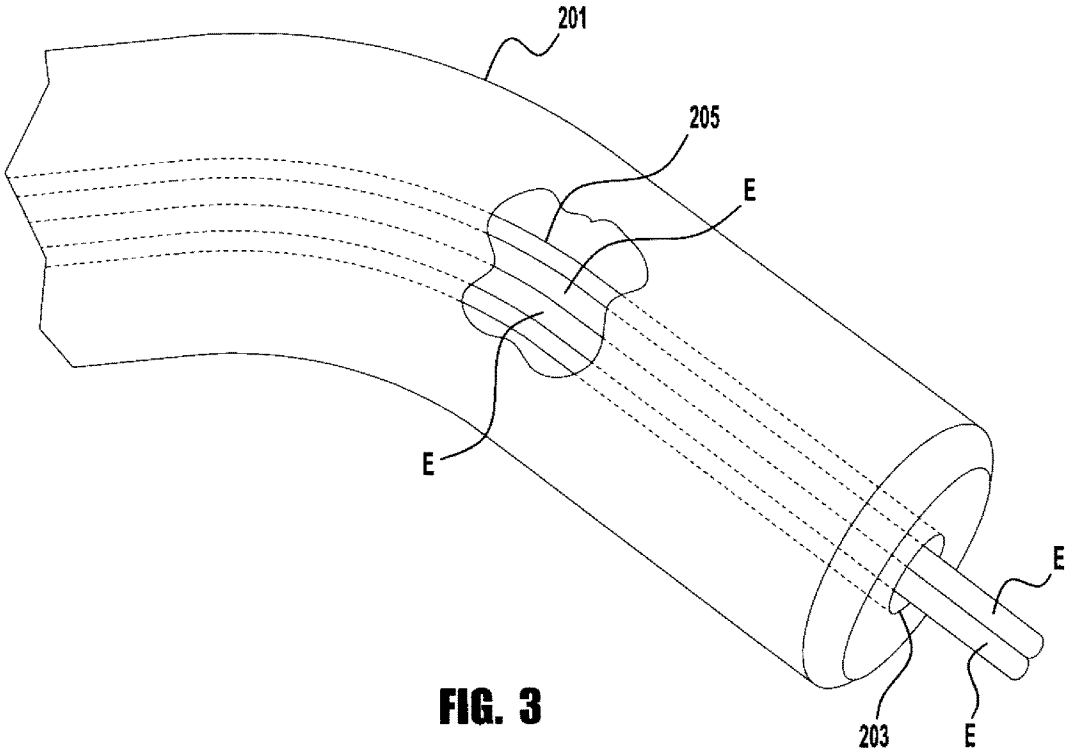
FIG. 3 illustrates a diagrammatical representation of a further exemplary embodiment of the present invention.

Further, in exemplary embodiments of the present invention the contact tip 101 utilized can be a straight bore type tip. However, in further exemplary embodiments of the present invention, the contact tip can be of a gooseneck type. This is depicted in FIG. 3, in which the contact tip 201 is bent at an angle. In this embodiment the electrode channel 205 is also bent as shown in FIG. 3. In exemplary embodiments of the present invention, the channel 205 is configured to orient the electrodes E relative to each other, as desired. For example, in the embodiment shown the downward angling of the channel 205 in the tip 201 causes the electrodes E to align in a side-by-side orientation when the electrodes E exit the orifice 203. Thus, it is contemplated that the angling and/or cross-section of the channel 205 in the tip 201 can be configured to orient the electrodes E as desired for a particular welding operation.

In another exemplary embodiment, rather than the tip being bent, a standard "gooseneck" type welding gun can be used. In such welding guns, the gun itself has some bent portions through which the electrode travels prior to engaging with the tip, in which the tip can be a standard straight contact tip. In exemplary embodiments of the present invention, such a welding gun is employed such that the electrodes E align themselves appropriately within the bends of the welding gun. In fact, it has been discovered that standard "gooseneck" type welding guns can be used with embodiments of the present invention, such that as the electrodes E pass through the welding gun the electrodes E become aligned in a side-by-side configuration and exit the tip in a side-by-side configuration. Thus, for example, the image of the tip 201 shown in FIG. 3 could be a welding gun tube to which a tip is coupled, rather than a bent torch tip (this is diagrammatically depicted in FIG. 5 discussed below). In fact, in various exemplary embodiments of the present invention, the bend in the torch tube or the torch tip 201 can be as high as 60 degrees. Because the structure and construction of welding guns having a bend are well known in the welding industry they will not be described in detail herein.

Within the channel 205 the electrodes E are positioned adjacent to each other, such that the electrodes are longitudinal to each other throughout the length of the channel 205. The electrodes E may change positioning in the channel E as the electrodes E pass through the channel 205 (that is they may move from side-to-side to on top of each other), but the electrodes E remain longitudinal to each other throughout the length of the channel 205. That is, the electrodes E do not intertwine or twist with each other.

It is known that some electrodes E are [manufacturing] *manufactured* having a cast. It is also known, in single electrode operations, that the shape/curvature of the channel 205 (such as in a gooseneck shaped contact tip 101) can orient the cast in the electrode E with the channel 205. Similarly, embodiments of the present invention employ the shape of the channel 205 to aid in orienting the electrode E in conjunction with the cast of the electrode E.

Figure 4A:
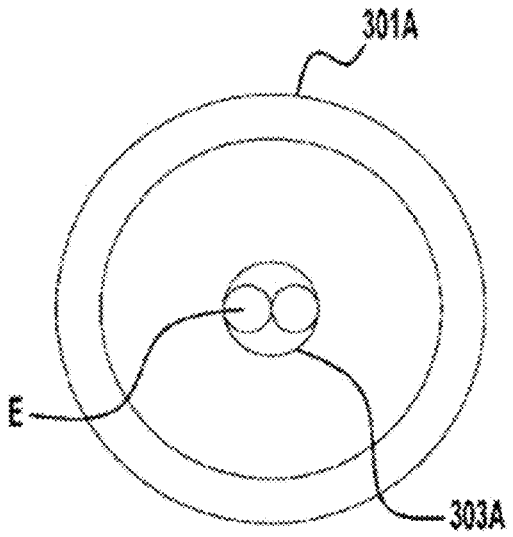
FIGS. 4A to 4C illustrate diagrammatical representations of various exemplary embodiments of the present invention; [and]
Figure 4B:
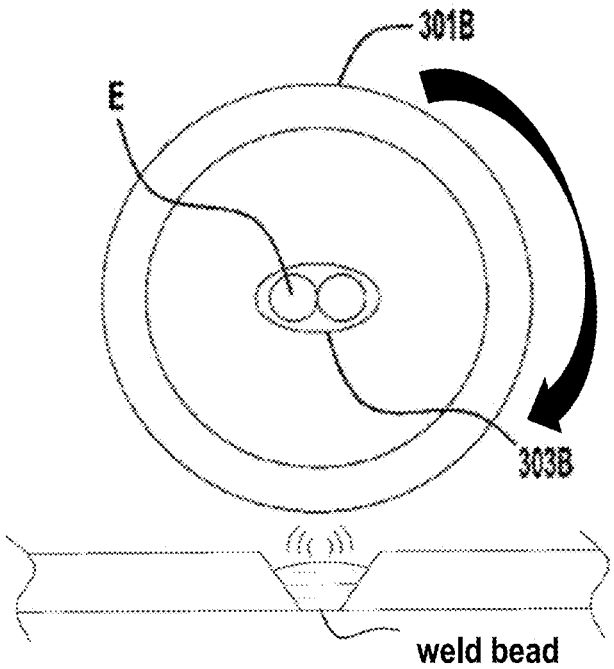
Figure 4C:
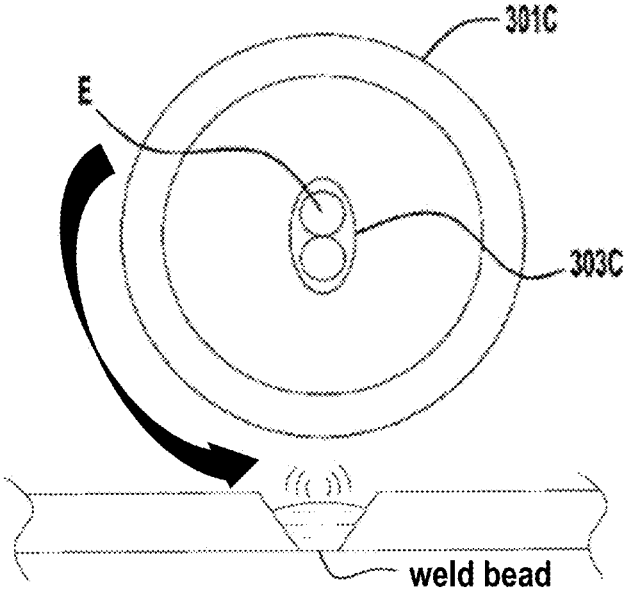

FIGS. 4A-4C depict various orifice configurations for exemplary embodiments of the present invention. As shown in FIG. 4A a circular orifice 303A is employed in the contact tip 301A. The tip 301A can be of a straight or gooseneck type tip. Further, in this embodiment the tip channel (not shown) internal to the tip 301A can have a constant cross-section with the orifice 303A. However, in further exemplary embodiments, the channel can have a cross-section which is different from the orifice 303A so as to orient the electrodes E within the channel before the electrodes E exit the orifice 303A. In a further exemplary embodiment, as shown in FIG. 4B the orifice 303B has a horizontally oriented orifice with an elliptical shape to orient the electrodes in a side-by-side orientation. Similarly, in FIG. 4C the orifice 303C has an elliptical shape which is oriented vertically so that the electrodes E are oriented in a front-to-back orientation.

As with the embodiment in FIG. 4A, in the embodiments shown in FIGS. 4B and 4C, some exemplary embodiments the channel (not shown) in the tip 301B/C has the same cross-section as the orifice 303B/C, while in other embodiments the cross-section of the channel can vary from the orifice 303B/C. For example, it is contemplated while the orifice 303B/C has an elliptical shape; the channel has a circular cross-section. Thus, the shaping of the orifice and/or the tip channel can be configured to orient the electrodes as desired during a welding operation. Additionally, it is noted that the present invention is not limited to either a circular or elliptical shape orifice 303A/B/C as shown in FIGS. 4A-C, but other shapes, such as oval may be used. The present invention is not limited in this regard so long as the desired electrode orientation is achieved during welding.

Further, in exemplary embodiments of the present invention, the contact tip 301B/C is of a design that can be rotated so as to be oriented in at least two positions within a welding gun or welding torch, such that the same contact tip 301B/C can be used to orient the electrodes E in a side-by-side or tandem configuration. In this embodiment, it is not necessary to use two different contact tips for two different welding operations, but rather the change in the orientation of the tip in the torch or gun. Thus, for example, during a welding operation if a turn is to be made it is not necessary to change to the tip or the orientation of the welding torch, just the tip.

In an exemplary embodiment of the present invention a drive mechanism is employed to orient the tip 301B/C within the welding gun. In such an embodiment, the drive mechanism, such as a motor or other means, can turn the tip [301N/C] *301B/C* as desired to achieve the desired orientation (*e.g., FIG. 4B shows the tip 301B rotatable to horizontally orient the electrodes E and FIG. 4C shows the tip 301C rotatable to vertically orient the electrodes E*). This can be controlled by an operator or via a computer system, such as in robotic welding operations. Thus, during welding an operator can control manually or automatically the orientation of the tip 301B/C to achieve the desired weld puddle during welding. This control can be achieved remotely, such as at the control center of a welding station or can be controlled at the welding torch. The present invention is not limited in this regard.

Turning now to FIG. 5 an exemplary embodiment of a welding system 400 in accordance with an exemplary embodiment of the present invention is depicted. The welding system 400 contains a welding power source 409 which is coupled to both a welding torch 411 (having a contact tip—not shown) and a wire feeder 405. The torch 411 can be coupled to any known or used welding gun or torch and can be of a straight or gooseneck type as described above. The wire feeder 405 draws the electrodes E1 and E2 from electrode sources 401 and 403, respectively, which can be of any known type, such as reels, spools, containers or the like. The wire feeder 405 is of a known construction and employs feed rolls 407 to draw the electrodes E1 and E2 and push the electrodes to the torch 411. *In the illustrated embodiment, the wire feeder 405 includes one pair of feed rolls 407.* In an exemplary embodiment of the present invention, the feed rolls 407 and wire feeder 405 are configured for a single electrode operation. It has been discovered that embodiments of the present invention, using a dual wire configuration, can be utilized with a wire feeder 405 and rollers 407 only designed for a single wire feeding operation, *such as rollers having only one operable groove for retaining and feeding the single wire*. For example, rollers 407 can be configured for a single 0.045 inch diameter electrode, but will *be* suitable *to* drive two electrodes of a 0.030 inch diameter without modification to the wire feeder 405 or the rollers 407.

Once driven by the rollers 407, the electrodes E1 and E2 are passed through a liner 413 to deliver the electrodes E1 and E2 to the torch 411. The liner 413 is appropriately sized to allow for the passage of the electrodes E1 and E2 to the torch 411. For example, for two 0.030 inch diameter electrodes, a standard 0.0625 inch diameter liner 413 (which is typically used for a single 0.0625 inch diameter electrode) can be used with no modification.

Although the examples referenced above discuss the use of two electrodes having a same diameter, the present invention is not limited in this regard as embodiments can use electrodes of a different diameter. That is, embodiments of the present invention can use an electrode of a first, larger, diameter and an electrode of a second, smaller, diameter. In such an embodiment, it is possible to more conveniently weld two work pieces of different thicknesses. For example, the larger electrode can be oriented to the larger work piece while the smaller electrode can be oriented to the smaller work piece. Further, embodiments of the present invention can be used for many different types of welding operations including, but not limited to, metal inert gas, submerged arc, and flux-cored welding. Further, embodiments of the present invention can be used for automatic, robotic and semi-automatic welding operations. Additionally, embodiments of the present invention can be utilized with different electrode types. For example, it is contemplated that a cored electrode can be coupled with a non-cored electrode. Thus, embodiments of the present invention can be utilized a broad spectrum of welding operations.

A method of employing an exemplary embodiment of the present invention will now be discussed. Based on a welding operation to be performed electrodes E1 and E2 are selected and an electrode orientation for the welding operation is determined. If it is desired that a longer welding puddle is needed to eliminate porosity, for example for welding galvanized steel, then the appropriate welding torch 411 and contact tip is selected. Alternatively, if it is desired that side-by-side welding is needed, for example for welding sheet metal, then the torch 411 and/or a tip is selected appropriately.

During operation, the wire feeder 405 provides the electrodes E1 and E2 to the torch 411. The power supply 409 provides the desired welding waveform to the torch 411 for the welding operation. Embodiments of the present invention can be utilized with many different types of welding waveforms. For example, embodiments of the present invention can be utilized with pulse welding, short arc welding, surface tension transfer welding, as well as many other types of welding waveform profiles.

During welding, a standard stick-out distance can be utilized. For example, a stick-out of ¾ to 1 inch can be used. As discussed above, the power supply supplies a welding waveform suitable for welding the collective cross-sectional area of the electrodes E1 and E2. For example, if welding with two 0.030 inch diameter electrodes E1 and E2 a welding waveform having sufficient energy or welding current for welding with a single 0.045 inch diameter electrode can be utilized to provide a suitable weld. It is noted that although the cross-sectional area of two 0.030 inch diameter electrodes is not mathematically identical to that of a single 0.045 inch diameter electrode, for purposes of the present invention the relative cross-sectional areas are substantially the same. Surprisingly, it has been discovered that the use of a welding waveform designed for a single 0.045 inch diameter electrode (for example) can be utilized with two 0.030 inch diameter electrodes, requiring no change to the waveform (such as current, etc.) and results in a stable welding operation with the benefits stated above. This avoids the drawbacks of increased heat input that would result from welding with an electrode having a total cross-section larger than needed. That is, the present invention allows for a weld puddle/bead to be increased in size (for example having a width of 0.060 inches) while the total heat input into the weld is that which would normally come from the use of a smaller electrode (for example and electrode having a diameter of 0.045 inches). Of course, the present invention is not limited to the above electrode size examples, which are merely provided as examples to demonstrate the benefits and versatility of the present invention.

This reduction in overall heat input is highly advantageous in many respects. For example, with exemplary embodiments of the present invention it is possible to deposit more filler material (from the electrodes) for a given welding amperage, or to deposit the same amount of filler material with an overall less heat input.

Further, it has been discovered that other advantages can be attained from embodiments of the present invention. Specifically, it has been discovered that during short arc welding an increased range of operable wire feed speed can be obtained because of the increased arc stability provided with welding in accordance with embodiments of the present invention. For example, it has been unexpectedly discovered that two 0.030 inch diameter electrodes can be utilized at a higher wire feed speed, in a stable manner, than a single 0.045 inch diameter electrode, even though the overall cross-sectional area of the two 0.030 inch diameter electrodes is similar to that of a single 0.045 inch diameter electrode, the use of two 0.030 inch diameter electrodes provides a more stable welding. It is believed that this is due to the increase in overall exposed surface area of the two 0.030 inch diameter electrodes for a given stick-out distance over a single 0.045 inch diameter electrode. Because of this increased electrode surface area the arc pinch force is optimized, resulting in a more stable welding arc at higher wire feed speeds.

Therefore, various embodiments of the present invention can not only reduce the overall heat input into a weld while increasing the weld puddle length or width, but can also provide a more stable welding arc at higher wire feed speeds.

Further, although the exemplary embodiments have been discussed above utilizing two electrodes passing through the same orifice, other embodiments of the present invention can utilize more than two electrodes. For example it is contemplated that a three electrode configuration can be utilized consistent with the descriptions and discussions set forth above.

It is noted that the present invention is not limited by the type of welding wire to be utilized or the type of welding operation, but can be used in many different types of welding operations with many different types of welding electrodes and electrode combinations.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

[1. An arc welding system, comprising:

a welding gun including a contact tip having a channel and an exit orifice;

an arc welding power supply which provides an arc welding waveform to at least two arc welding consumable electrodes having a circular cross-section via said contact tip; and a wire feeding mechanism which provides said at least two arc welding consumable electrodes from respective electrode sources to said channel in said contact tip, where said arc welding electrodes pass through said channel in a longitudinal orientation without intertwining or twisting with each other and exit said contact tip through said exit orifice.]

[2. The welding system of claim 1, wherein said channel is angled.]

[3. The welding system of claim 1, wherein said orifice has either an elliptical or oval shape.]

[4. The welding system of claim 1, wherein said channel has a cross-sectional shape at at least one point along its length which is different from the cross-sectional shape of said orifice.]

[5. The welding system of claim 1, wherein said channel has a circular cross-section at at least one point along its length.]

[6. The welding system of claim 1, wherein said contact tip is rotatable so as to change the orientation of said at least two electrodes relative to a weld bead.]

[7. The welding system of claim 1, wherein said at least two electrodes have a different diameter from each other.]

[8. The welding system of claim 1, wherein said at least two electrodes have a different composition.]

[9. The welding system of claim 1, wherein said welding waveform provides a welding current sufficient to weld with a single electrode having a cross-sectional area substantially the same as the total cross-sectional area of said at least two electrodes.]

*10. An arc welding system, comprising:*

*a welding torch;*

*a contact tip;*

*a channel for receiving two arc welding consumable electrodes from respective electrode sources, wherein said arc welding electrodes pass through said torch in a longitudinal orientation without intertwining or twisting with each other and exit said torch; and*

*a single wire feeder which drives said two arc welding consumable electrodes from said respective electrode sources to said channel;*

*wherein said two arc welding consumable electrodes are in contact with each other within said channel;*

*wherein said wire feeder comprises a single pair of feed rollers configured to drive said two arc welding consumable electrodes to said channel, said feed rollers being designed for a single wire feeding operation; and*

*wherein an arc welding power supply provides a single arc welding waveform through said contact tip for consuming said two arc welding consumable electrodes to generate one arc and one weld puddle from said two arc welding electrodes.*

*11. An arc welding system, comprising:*

*a contact tip, wherein said contact tip aligns two arc welding electrodes from respective electrode sources to pass through said contact tip in a longitudinal orientation without intertwining or twisting with each other and exit said contact tip, wherein said two arc welding electrodes are in contact with each other as the two arc welding electrodes pass through said contact tip, and wherein an arc welding power supply provides an arc welding waveform through said contact tip to consume said two arc welding consumable electrodes to generate one arc and one weld puddle from said two arc welding electrodes; and*

*a single wire feeder which drives said two arc welding consumable electrodes from said respective electrode sources to said contact tip;*

*wherein said wire feeder comprises a single pair of feed rollers configured to drive said two arc welding electrodes to said contact tip, each roller having a single operable groove for driving said electrodes.*

*12. The welding system of claim 10, further comprising a liner disposed between said welding torch and said wire feeder, wherein said wire feeder drives said two electrodes from respective electrode sources through said liner to said welding torch.*

*13. The welding system of claim 12, wherein said two electrodes pass through said liner in a longitudinal orientation without intertwining or twisting with each other to deliver said two electrodes to said welding torch.*

*14. The welding system of claim 11, further comprising:*

*a welding torch and a liner disposed between said welding torch and said wire feeder, wherein the welding torch includes the contact tip, and wherein said wire feeder drives said two electrodes from respective electrode sources through said liner to said welding torch.*

*15. The welding system of claim 14, wherein said two electrodes pass through said liner in a longitudinal orientation without intertwining or twisting with each other to deliver said two electrodes to said welding torch.*

*16. The welding system of claim 10, wherein said contact tip comprises a single orifice.*

*17. The welding system of claim 16, wherein said two electrodes exit said contact tip through said orifice.*

*18. The welding system of claim 11, wherein said contact tip comprises a single orifice.*

*19. The welding system of claim 18, wherein said two electrodes exit said contact tip through said orifice.*

*20. The welding system of claim 10, wherein a single arc welding power supply provides the arc welding waveform.*

*21. The welding system of claim 11, wherein a single arc welding power supply provides the arc welding waveform.*

*22. The welding system of claim 16, wherein said orifice has either an elliptical or oval shape.*

*23. The welding system of claim 18, wherein said orifice has either an elliptical or an oval shape.*

*24. The arc welding system of claim 10, wherein each of said arc welding consumable electrodes has a diameter of 0.030 inches.*

*25. The arc welding system of claim 11, wherein each of said arc welding electrodes has a diameter of 0.030 inches.*

* * * * *